United States Patent
Seibel

[11] 3,725,909
[45] Apr. 3, 1973

[54] ROTATING COIL MAGNETIC INDICATOR

[75] Inventor: Georg Seibel, Dreieichenhain, Germany

[73] Assignee: Schoeller & Co., Frankfurt A.M. Sud, Germany

[22] Filed: Feb. 22, 1971

[21] Appl. No.: 117,625

[52] U.S. Cl. .......................340/373 R, 340/366 R
[51] Int. Cl. ...........................G08b 5/14, G08b 5/22
[58] Field of Search .................................340/373 R

[56] References Cited

UNITED STATES PATENTS

| | | | |
|---|---|---|---|
| 2,633,566 | 3/1953 | Oliwa | 340/373 |
| 3,014,208 | 12/1961 | Peterson | 340/373 X |
| 3,199,100 | 8/1965 | Edwards | 340/373 |
| 3,375,512 | 3/1968 | Watkins | 340/373 |
| 3,496,564 | 2/1970 | Achilles | 340/373 X |
| 3,571,720 | 3/1971 | Heagney | 325/470 X |

Primary Examiner—Harold I. Pitts
Attorney—Toren & McGeady

[57] ABSTRACT

In the indicator disclosed, a coil, rotatably suspended between two pivoting straps, passes through the center of a tubular high coercivity magnet and surrounds the magnet from the center to the outside. The magnet forms a longitudinal gap. The straps are coaxial with the magnet. Current through the coil rotates it so that its outer portion moves peripherally along the magnet. A drum surrounding the magnet and traveling with the coil carries a helical indication. The latter is visible through a gap on a stationary slide indicator. Rotation of the coil moves the visible indication laterally along the gap. The device is suitable for indicating channels or stations on television or radio sets in response to electrical signals.

32 Claims, 13 Drawing Figures

PATENTED APR 3 1973　　　　　　　　　　　　　3,725,909

Inventor
GEORG SEIBEL
BY Toren and McGeady
ATTORNEYS

Inventor
GEORG SEIBEL
BY Toren and McGeady
ATTORNEYS

ROTATING COIL MAGNETIC INDICATOR

BACKGROUND OF THE INVENTION

This invention relates to electric rotating coil indicators, particularly for pointing to the channel or station to which a viewer or listener is tuned in radio or television sets.

Capacitance diodes for frequency tuning radio or television sets have made it possible to replace mechanical station indicating mechanisms with electrical measuring instruments such as volt meters. Such capacitance diodes are normally used for tuning such radio or television sets. Variation of the voltage applied to such a diode therefore varies the tuning. Since the voltage and capacitance are interrelated according to a predetermined relationship it is possible to indicate to which channel a radio or television set is tuned on the basis of the voltage. Thus, if the voltage supplied to the capacitance diode is simultaneously applied to a volt meter whose scale carries station markings the volt meter may constitute an electric station indicator or channel indicator.

Such an electric station indicator or channel indicator may be mounted on a radio or television set by a manufacturer at any point independent of the location of the tuning apparatus or the tuning knob. Only two electric wires are necessary for connecting the tuning apparatus to the indicator. This is a significant advantage because it eliminates the cumbersome mechanical indicating equipment that had to be mechanically linked with the tuning apparatus. Normally such mechanical indicators were arranged in the immediate vicinity of the tuning apparatus in order not to complicate the already complex equipment. Generally, the mechanical linkages between the indicators and the tuning apparatus required the use of cables, levers, gears and other such components. Moreover, the force necessary to switch from one channel to the next was considerable.

An object of the invention is to improve rotating coil indicators.

Another object of the invention is to furnish an electric indicating instrument which is particularly suited for indicating stations or channels.

Still another object of the invention is to produce a station or channel indicator having a wide deflection.

Another object of the invention is to convert a wide angle rotating coil, voltage responsive, instrument to a sliding scale indicator for channel representation or station representation in television or radio sets.

According to a feature of the invention these objects are achieved, and the disadvantages of the prior art obviated, by surrounding a wall of an annularly shaped tubular high-coercivity magnet with a coil that is eccentrically suspended from straps coaxial with the magnet and that thereby moves along the magnet as it rotates, and by supporting the straps with means that project from a rail fitted into a longitudinal gap in the tubular magnet.

According to another feature of the invention a drum surrounding the entire periphery of the magnet and the rail is secured to the coil so that as the coil rotates about the straps the drum rotates with it. A helical mark along the drum surface then projects through a slot in a stationary frame. Rotation of the drum therefore moves the portion of the marking visible through the slot, along the slot in a translatory manner.

By virtue of these features a sliding scale type of indicator is achieved. Almost the total length can be utilized for station representation. Extremely little space is required. This provides substantial advantages in modern compact radio and television sets.

According to another veature of the invention the means for supporting the straps include damping means, clamping springs, and terminal means for external electrical connections.

According to another feature of the invention a housing encloses the entire measuring device.

Because of these features, varying the strap suspension makes it possible to vary the length of the sliding scale within wide limits without changing the components necessary for producing the actual electrical indication, namely the magnet, the rotating coil, the damping means, the clamping springs for the straps and the electrical terminals. Only the parts which are necessary for varying the length, such as the indicator drum, the straps, the means for supporting the straps and the housing need have a new construction.

The features permit a very wide angle deflection of the indicator drum, at least 230°. This permits a highly defined accurate indication.

In a known wide angle measuring system for an indicator instrument, a rotating coil, mounted on points, surrounds a "magnetically conductive" ring, a solid permanent magnet is mounted under the ring. The magnet and magnetically conducting ring are interconnected by magnetic conductor pieces. Such a system is not simply transformable into a measuring mechanism having an indicator drum because the solid magnet blocks the way. It does not permit downward extension of the indicating drum which is arranged in the operating air gap of the magnet system. Such extension would be necessary to achieve a sliding scale translatory indication. Moreover, because its solid parts require considerable space, and because of its complicated construction. This known wide-angle indicator measuring system is too expensive to manufacture to consider as a quantity produced article for installation in radio and television receivers.

According to another feature of the invention a cylindrical sheet metal shell is arranged concentrically around the magnet and provided with a longitudinal slot. This serves, together with the holding rail, as an iron flux return for the magnet of the measuring mechanism. The sheet metal shell is slipped on to support discs disposed on the holding rail The discs receive labyrinth springs for retention of the straps.

According to another feature of the invention the support discs may have a circular aperture for insertion of an insulating ring for the labyrinth springs of the straps and a sector-shaped slot for insertion of the indicator drum when the device is assembled.

According to yet another feature of the invention the labyrinth springs are provided with soldering lugs for connection of current supply lines. Cover plates are placed on the support discs for the protection of the labyrinth springs. The housing includes a plastic frame made of insulating material and of a cylindrical sheet metal shell inserted in the frame. The shell serves as an iron flux return. The cylindrical sheet metal shell is preferably provided with a longitudinal slot which permits clamping of the shell to the support disc after insertion of the measuring mechanism. The slot preferably also serves as a viewing slot for the indicator drum.

According to another feature of the invention the two housing parts are connected together by gluing. To render floodlight illumination of the scale possible the plastic may have transverse bores at its upper and lower ends for the insertion of lamps.

According to another feature of the invention the plastic frame includes an elevation or protrusion for receiving a frame-shaped scale window. The latter serves to retain the scale by means of hook-shaped projections extending into depressions in the plastic frame. The depressions of the plastic frame can be constricted by heat treatment to fix the lugs of the scale window.

According to another feature of the invention an iron sleeve is inserted in the annularly shaped tubular magnet. The sleeve forms a longitudinal slot. Fixing jaws project from the sleeve into the slot for engaging the holding rail.

According to another feature of the invention a corrugated steel sheet is placed between the tubular magnet and the iron sleeve inserted therein so as to compensate for manufacturing tolerances and bridge the magnetic lines of force in the air gaps.

According to another feature of the invention pointed picks with notches or hooks jut out on both sides of a frame for the rotating coil. These hooks engage the indicator drum and lock it in place on the coil.

Preferably the picks include spring laminations to dampen impact.

According to yet another feature of the invention shock relief and damping devices are mounted on the holding rail. Preferably these are in the form of a completely closed damping chamber containing the damping fluid. Preferably the damping device is composed of two parts adapted to be plugged together. A disc connected to the rotating coil frame rotates in the chamber formed by the two parts. This disc may be slit and have a flap which is bent out and attached to the coil frame. The damping device preferably forms a bore. Holding plates secured to the coil frame project into the bore to receive the clamps for attaching the straps. The holding plates may be provided with shoulders for radial and axial shock relief.

These and other features of the invention are pointed out in the claims. Other objects and advantages of the invention will be obvious from the following detailed description when read in light of the accompanying drawings.

DESCRIPTION OF PREFERRED EMBODIMENT

In FIGS. 1 to 4, a rotating coil indicator I embodying features of the invention is covered by a plastic frame 1. A cylindrical sheet metal shell 2 covers the rear of the indicator and serves as an iron flux return. A measuring mechanism 3 is fitted to the shell. A support rail 4 in the shell holds two support discs 5 and 6. Mounted on the U-shaped support rail 4 are a tubular permanent magnet 7 and two shock relief and damping devices 8 and 9. Fitted in circular apertures of the support discs 5 and 6 are insulating rings 11. The latter receive labyrinth springs 13 provided with soldering lugs 12 for straps 14. Covering plates 10 placed on the support discs 5 and 6 protect the labyrinth spring 13 from dust, dirt and damage. An annular slot 15 in the support disc 5 receives an indicator drum 16 which is placed therein during assembly of the indicator. The cylindrical sheet metal shell 2 forms a longitudinal slot 17 and is clamped by means of the support discs 5 and 6.

Figure 5:
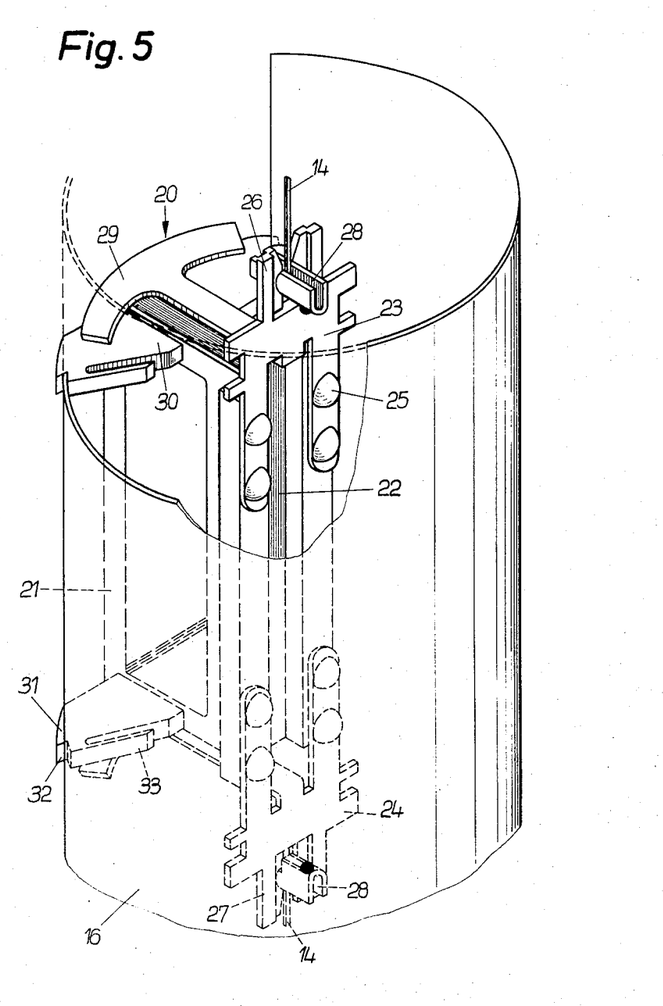
FIG. 5 is a perspective view of a rotating coil frame within the indicator of FIG. 1 showing an indicator drum partially cut away.

As shown in FIG. 5, a rotating coil assembly 20 is formed by a frame 21 which supports a conductor winding 22. Two holding plates 23 and 24 are secured to the frame 21 with pointed thermoplastic pins 5 shaped like rivets by heat, or in any other manner. The holding plates 23 and 24 terminate into two jaws 26 and 27. These each receive a U-shaped strap support 28 to which the strap 14 are soldered. The straps 14 then pass outwardly. To form a calibration weight for the movable part of the measuring mechanism, the holding plates 23 and 24 support a rearwardly bent, anchor-shaped lobe 29, which receives soldering tin during calibration.

Pointed picks 30 and 31 on both sides of the coil frame 21 form notches 32 for holding the indicator drum 16. Resilient projections 33 absorb shocks when the frame 21 rotates on straps 14 and strikes the U-rail 4.

Figure 6:
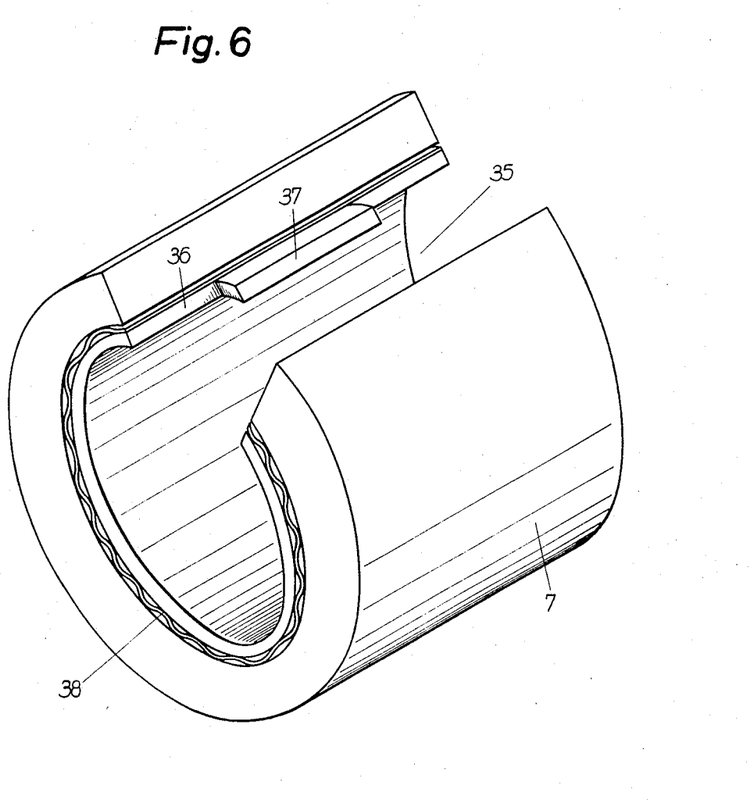
FIG. 6 is a detailed perspective illustrating the magnet for the indicator in FIG. 1.

The magnet 7 appears in FIG. 6. It is slipped into the coil frame 21 by means of a slot 35. The magnet 7 grasps the U-rail in the slot. In the tubular magnet 7 an iron sleeve 36 carries projection 37 for securing the magnet to the U-rail 4. A corrugated steel sheet 38 inserted between the magnet 7 and the interior iron sleeve 36 compensates for manufacturing tolerances and forms a bridge for magnetic lines of force across the air gaps.

Figure 2:
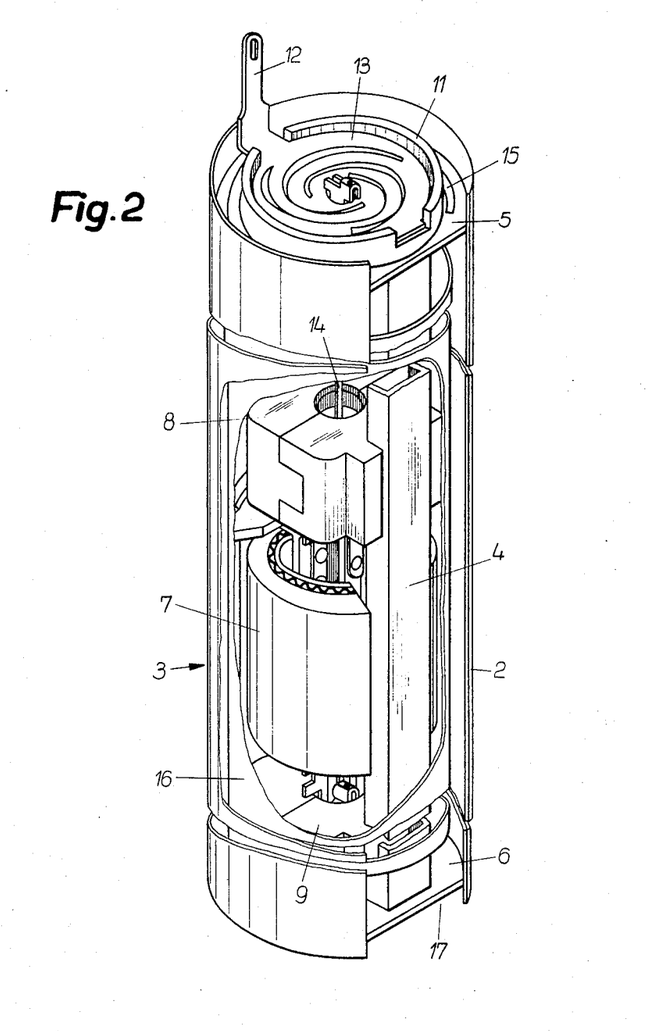
FIG. 2 is a broken away perspective view of the rotating coil indicator in FIG. 1 without its plastic frame, and showing a slit flux return sheet metal shell and slit indicator drum.
Figure 4:
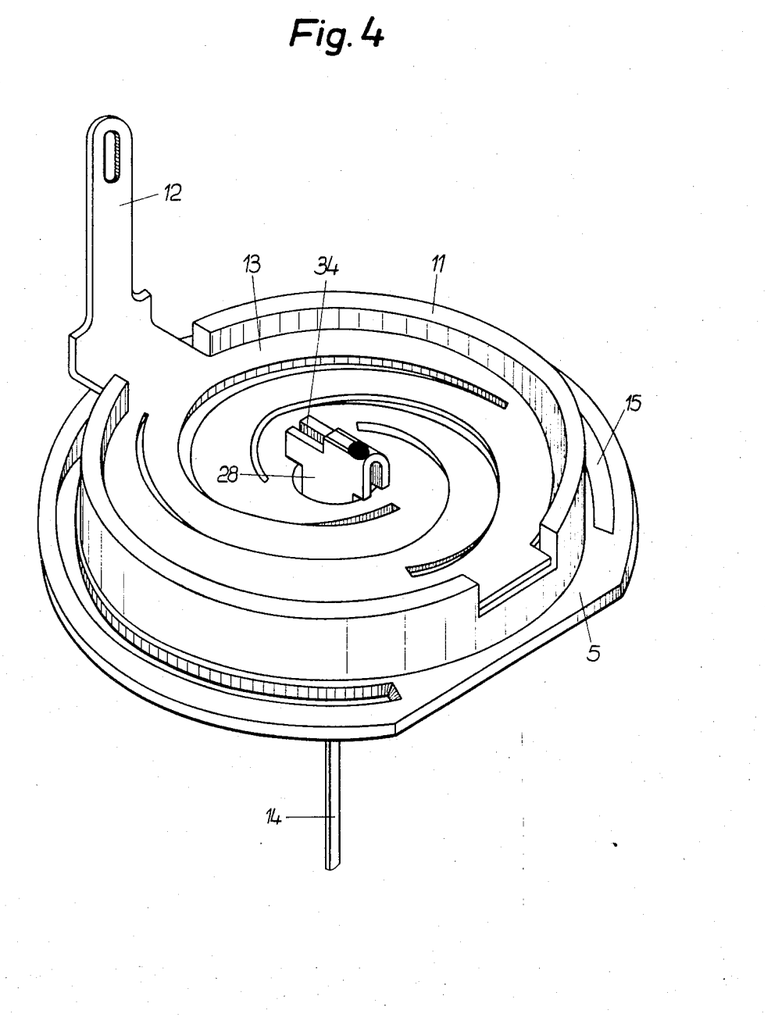
FIG. 4 is a perspective view illustrating a labyrinth spring inserted in the support frame for the strap suspension in the indicator of FIG. 1.
Figures 7, 8:
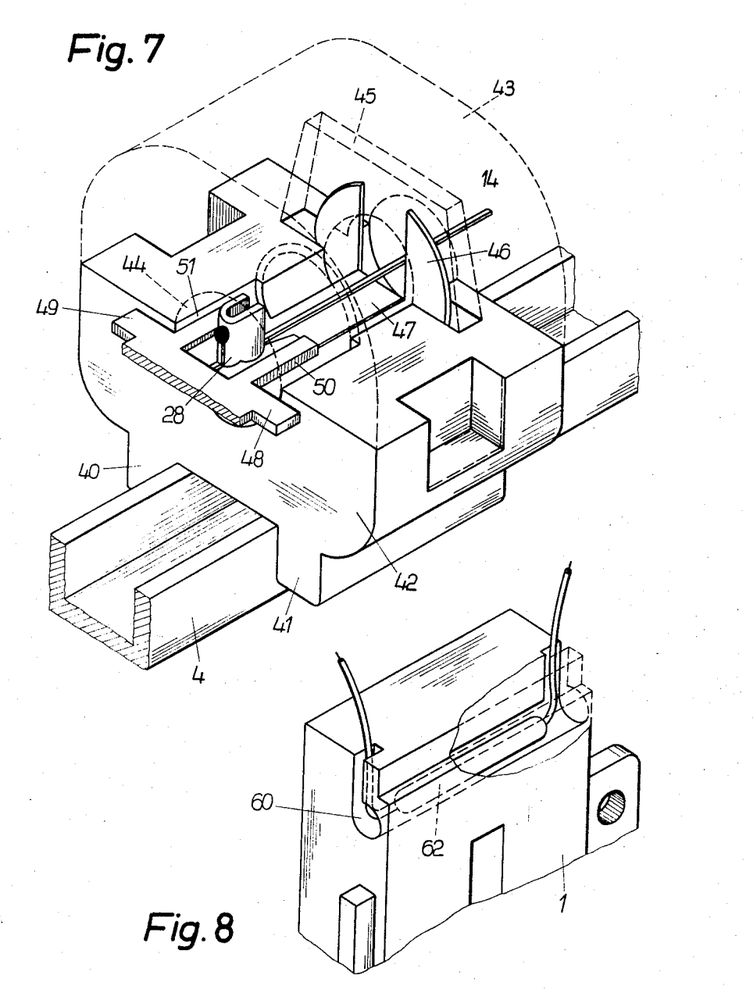
FIG. 7 is a perspective detail of a shock relief and damping device mounted the support rail of the indicator of FIG. 1.
FIG. 8 is a perspective view of a portion of the plastic frame in FIG. 1 and a scale illuminating lamp inserted therein.

FIG. 7 illustrates the shock relief and damping device 8 of FIG. 2 in detail. This device is a substantial mirror image of the device 9 of FIG. 2. Thus the details illustrated for the device 8 are equally true for the device 9. In the device 8 two cheeks 40 and 41 grasp the U-rail 4. The device 8 is formed of two interlocking housing halves 42 and 43 that plug into each other. The device 8 receives the strap 14 which passes through a bore 44. The latter is widened at one point to a chamber-like cavity 45 containing a damping fluid. In the cavity 45 a damping disc 46 projects into the damping fluid. A strip 47 bent at an angle of 90° from the disc 46 connects to the coil frame 21 by attachment to the holding plate 23. In the mirror image device 9 the strip 47 attaches to the holding plate 24. Projecting from the holding plate 23, as well as the holding plate 24 are two shoulders 48 and 49. These cooperate with the outer face of the housing of the shock limiting and damping device 8 (and 9) to absorb axial thrusts. The holding plate 23, as well as the holding plate 24, also includes two shoulders 50 and 51 which project into the bore 44. Together with the U-shaped strap support 28 these serve to absorb radial thrusts through the inner wall of the bore 44.

Figures 1, 3:
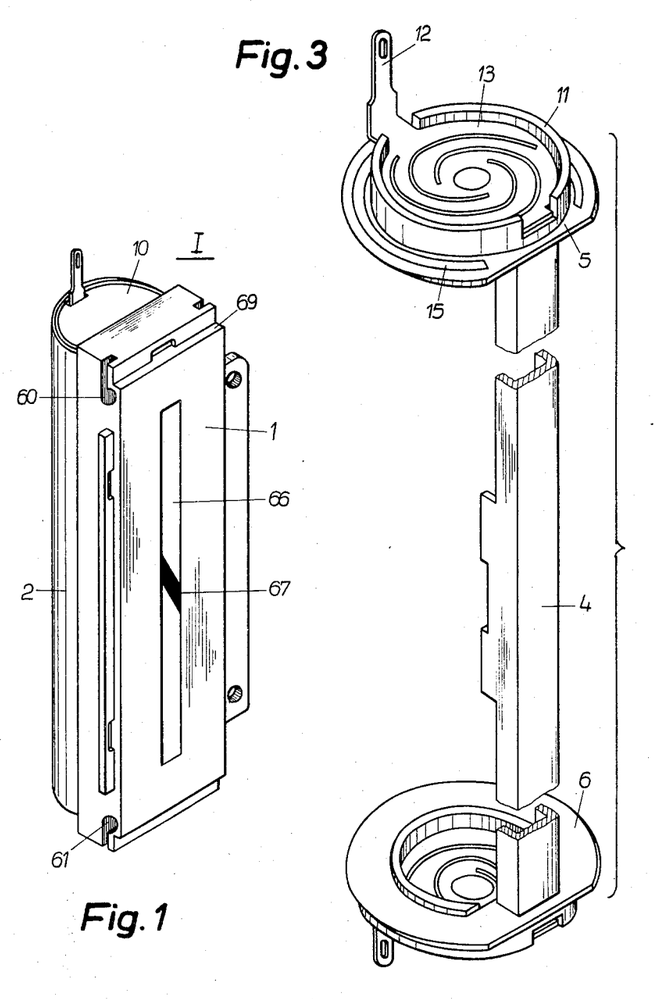
FIG. 1 is an overall perspective view of a rotating coil indicator without a scale and embodying features of the invention.
FIG. 3 is an exploded view of a U-shaped support rail with attached support discs for the suspension system of the indicator in FIG. 1.

As shown in FIGS. 1 and 8, transverse bores 60 and 61 in the upper and lower end of the plastic frame 1 receive scale illumination lamps 62.

Figure 9:
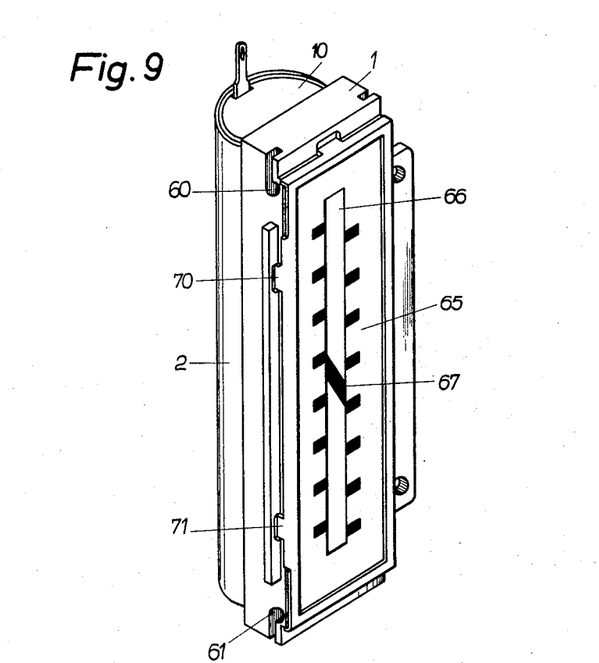
FIG. 9 is a perspective overall representation of the indicator in FIG. 1.
Figure 10:
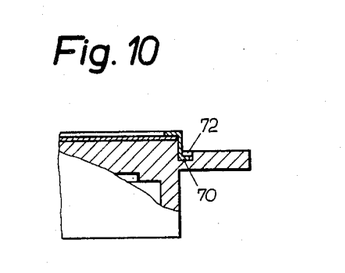
FIG. 10 is a partial section through the plastic frame with the scale window in FIG. 9.
Figure 11:
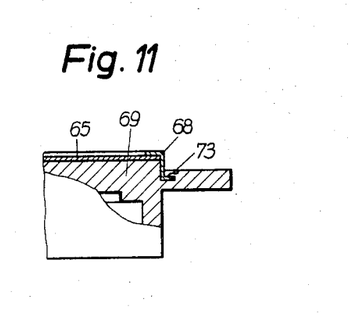
FIG. 11 is a partial section illustrating the means for securing the scale window of FIG. 10.

In FIG. 9 the plastic frame 1 has mounted thereon a scale 65. A slot 66 in the scale exhibits a portion of the helical marking strip 67 on the indicator drum. As shown in FIGS. 10 and 11 a window frame 68 holds the scale 65 on a projection 69. The frame 68 forms hook-shaped lugs 70 and 71 which protrude into depressions 72 in the plastic frame 1. Securing the lugs 70 and 71 is achieved by heating the plastic frame 1 in the region of the depression 72 and by displacement of the material at the point 73.

Figure 12:
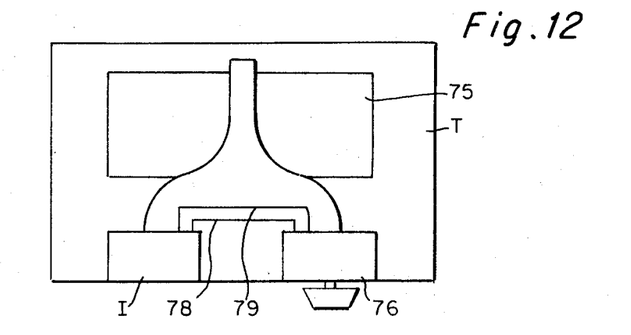
FIG. 12 is a partly plan view, partly block diagram of a television utilizing the indicator of FIG. 1 and embodying features of the invention.

FIG. 12 illustrates the indicator I of FIGS. 1 and 9 in a television set T. Here the television circuitry 75 includes a capacitive diode tuning system 76. A video picture tube 77 forms the television picture. A pair of wires 78 and 79 apply the voltage formed by the capacitive diode tuner to the indicator I.

In operation, the labyrinth springs 13 normally bias the rotating coil assembly 20. Thus the assembly 20 rotates about the straps 14 along the tubular magnet 7. That is to say that the springs bias the assembly 20 against the rail 4 by moving it circularly along the wall of the tubular magnet 7 while it continues to surround the wall of the tubular magnet 7 against one side of the rail. When the tuner applies a voltage to the conductive winding 22 of the assembly 20 it magnetically moves the assembly 20 against the biasing force in a circular movement along the magnet until an equilibrium is reached between the biasing force and the magnetic force due to the voltage. The movement is damped by the shock relief and damping device 8 and 9. The movement rotates the helical marking on the outer periphery of the drum 16 so that the marking 67 as seen through the slot 66 moves up and down relative to the scale 65.

The invention thereby achieves a wide swing sliding scale indicator that is responsive to the voltage from a capacitive diode tuner.

Figure 13:
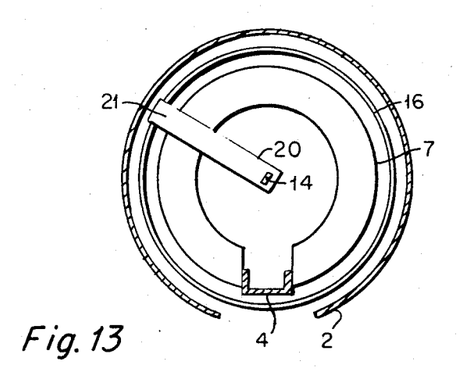
FIG. 13 is a somewhat schematic sectional view of the indicator showing the relationship between the magnet, the coil, the drum, and the shell of FIGS. 1 to 12.

The magnet 7 used herein is composed of a material of high coercivity. Its relationship to the coil 20, the drum 16 and the shell 2 is shown in FIG. 13. The coil frame 21 completely surrounds a portion of the magnet 7 as the frame rotates. The coil frame carries with it the drum 16.

As can be seen, an object of the invention is also to provide a television set with a tuning indicator remote from the tuner. It can also be appreciated that the invention involves the general feature of rotating a coil along that surrounds a portion of the magnet completely, and generates a locus that surrounds the entire magnet, the magnet having a circular shape and being highly coercive.

While embodiments of the invention have been described in detail it will be obvious to those skilled in the art that the invention may be practiced otherwise without departing from its spirit and scope.

What is claimed is:

1. An instrument comprising a magnet formed of a material of high coercivity and formed into a circular shape, said circular shape defining a central axis, said material defining axial bounds between a pair of planes transverse to the axis, said material having end portions that form a gap in the circular shape, coil means surrounding said material and having a plane extending radially relative to the axis, strap means coaxial with said material for rotatably supporting said coil means and for allowing said coil means to rotate about said material so said coil means may rotate and form a locus of lines surrounding substantially all of said material, rail means secured between the end portions for supporting said strap means, current application means for carrying current to said coil means, and analog indication means responsive to movement of said coil means.

2. An instrument as in claim 1, wherein said strap means support said coil means eccentrically of the axis so that said coil means surrounds a portion of the material extending radially in only one direction from the axis.

3. An instrument as in claim 2, wherein said material of said magnet forms a tube.

4. An instrument as in claim 3 further comprising shell means surrounding said magnet and said coil means, said shell means forming a slot and being inductively linked with said magnet for serving as a flux return for said magnet together with said rail means, a pair of support discs located longitudinally on opposite sides of said magnet and mounted on said rail means and supporting said shell means, a pair of labyrinth springs mounted on said discs for holding said strap means.

5. An instrument as in claim 4 wherein said discs form a circular aperture, said labyrinth springs having an insulating ring supported in said aperture.

6. An instrument as in claim 4 wherein said current application means includes a plurality of soldering lugs mounted on said labyrinth springs.

7. An instrument as in claim 4 wherein covering plates mounted on said discs protect said labyrinth springs.

8. An instrument as in claim 1, further comprising a plastic frame of insulating material and surrounding said magnet and said coil means, and a cylindrical metallic shell of low reluctance magnetic material surrounding said magnet and said coil means and inside said frame for serving as a flux return.

9. An instrument as in claim 6 wherein said indication means includes a drum mounted for rotation with said coil means inside said shell means, said drum carrying a helical indication, said shell forming a longitudinal slot, support discs for mounting said shell stationary relative to said magnet, said indication on said drum being viewable through the slot.

10. An instrument as in claim 9 wherein said frame and said shell are glued together.

11. An instrument as in claim 10 wherein said frame forms upper and lower transverse bores, a lamp in each of said bores.

12. An instrument as in claim 11 wherein a window is secured in said plastic frame, an elevation for attaching said window to said frame, a scale mounted on said window, hook-shaped lugs for securing said scale, said frame having a plurality of depressions for receiving said lugs.

13. An instrument as in claim 12, further comprising constrictions at said depressions in the plastic frame.

14. An instrument as in claim 1, wherein said gap is sufficiently wide for passage of said coil means therethrough.

15. An instrument as in claim 3, wherein an iron sleeve is fitted into said material, a pair of jaws projecting from said sleeve for engaging said rail means.

16. An instrument as in claim 15, wherein a corrugated sheet steel separates said sleeve and said material to compensate for manufacturing tolerances and to bridge the air gaps of the magnetic lines of force.

17. An instrument as in claim 1, wherein said coil means includes a coil frame, said coil frame having at its radially outward portion a pair of peripherally directed picks, said picks forming notches, said indication means including a drum, said drum engaging said notches for locking said drum on said coil means.

18. An instrument as in claim 17, wherein resilient projections extend from said coil frame, said resilient projections being resiliently engageable with said rail means during the excursion of said coil means about said magnet, said projections forming spring laminations to dampen impact with said rail means.

19. An instrument as in claim 1, comprising damping means mounted on said rail means, said damping means having a stationary portion connected to said rail means and a movable portion connected to said coil means.

20. An instrument as in claim 19, wherein said damping means includes means for forming a damping chamber for containing a damping fluid and a disc mounted for rotation in said chamber and adapted to enter said fluid, said disc being connected with said coil means for rotation therewith.

21. An instrument as in claim 20, wherein said means for forming the damping chamber includes two complementary plug-in portions having cup shapes so as to form a completely closed chamber.

22. An instrument as in claim 21, wherein a flap projects axially from said disc and is integral therewith, said disc having a slit aligned with said flap.

23. An instrument as in claim 22, wherein said damping means defines a bore, a holding plate projecting through said bore and secured to said coil frame, clamp means for holding said strap means, said clamp means being connected to said holding plate, said holding plate having shoulders projecting into the bore and radially of the bore for providing radial and axial shock relief.

24. A television system comprising circuit means for forming a television picture, tuner means for selecting the reception channel of said circuit means, said tuner means forming a voltage corresponding to the channel to which said tuner means tunes; indicator means, said indicator means including coil means responsive to the voltage applied by said tuner means, said coil means having a substantially open center, magnet means extending through said coil means and forming a link arrangement therewith, said magnet means being inductively coupled to said coil means, said magnet means being formed into a circular shape and having a gap, said magnet means having respective ends terminating at said gap, said magnet means having an axis, support means for rotatably supporting said coil means for rotation about the axis of said magnet means, said coil means being substantially eccentric relative to the axis of said magnet means, said coil means when rotating continuously surrounding successive portions of said magnet means, said coil means being constrained by the voltage applied thereto from said tuner means to rotate to a position relative to said magnet means as a result of the inductive coupling of said magnet means, and analog indicator means responsive to the rotation of said coil means.

25. A television as in claim 24, wherein said indicator means include a drum surrounding said magnet means and secured to said coil means for rotation therewith.

26. A television as in claim 25, wherein said drum includes a helical mark on its outer periphery, said indicator means further including a shell having a slot, said slot being longitudinal relative to said shell, said shell being substantially coaxial with said drum and surrounding said drum, whereby rotation of said drum by said coil means moves the position of said marker relative to the slot.

27. A television as in claim 26, wherein said indicator means include a window aligned with said slot and having the scale thereon, a facing for supporting said tuner and said indicator means, said indicator means being viewable on said facing.

28. An instrument as in claim 1, wherein said indicating means includes a drum surrounding said coil and said magnet and mounted for rotation with said coil, said drum having a helical indication on the periphery thereof, and structural means extending longitudinally along the periphery of the drum and fixed relative to said material for forming an index against which the indication moves longitudinally as said drum rotates.

29. An instrument as in claim 28, wherein said structural means surrounds said drum and forms a longitudinal gap along the index.

30. An instrument as in claim 29, wherein said structural means is magnetizable and forms a flux return for flux from said material.

31. A system as in claim 26, wherein said shell is magnetizable and forms a flux return for flux from said magnet means.

32. A system as in claim 24, wherein said coil means is rotatable about a major portion of a circle.

* * * * *